Patented Oct. 23, 1934

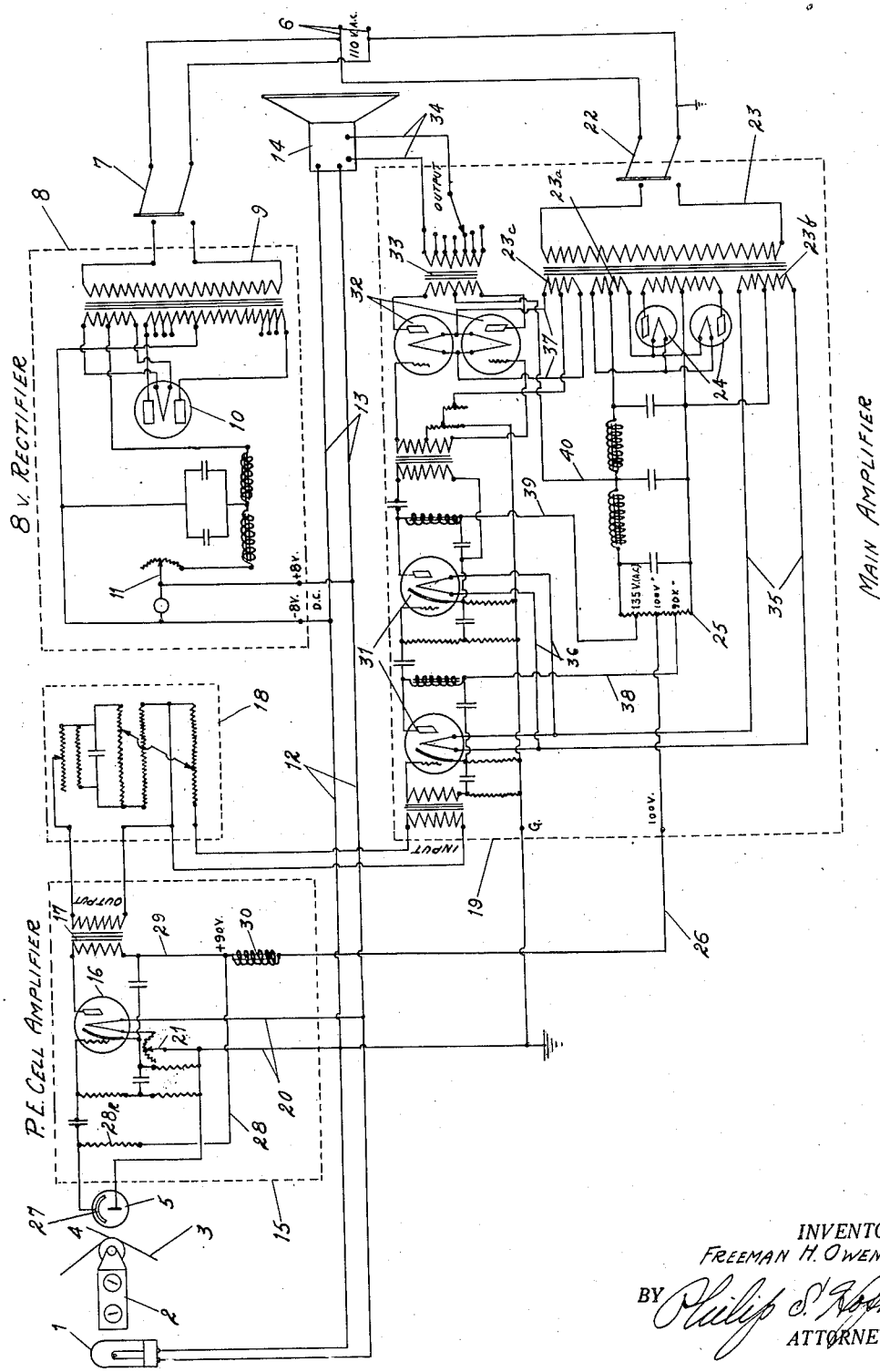

1,977,858

UNITED STATES PATENT OFFICE 1,977,858

MEANS AND METHOD FOR ELIMINATING HUM IN RECTIFIED ALTERNATING CURRENT OPERATED PHOTO-ELECTRIC CELL AMPLIFIERS

Freeman H. Owens, New York, N. Y.

Application February 16, 1931, Serial No. 515,943

5 Claims. (Cl. 179—100.3)

My invention relates to a means and method for eliminating hum in rectified alternating current operated photo-electric cell amplifiers.

It has long been a problem in the use of alternating current operated amplifiers for talking picture and other uses, to eliminate the 60 cycle and respective harmonic frequency power components in the direct current supply, as rectified, rendered disagreeably audible through the loud speakers, hereinafter referred to as hum, such hum being incident to the use of, and apparently inherent in alternating current amplifiers.

Particularly has this problem been a troublesome one in amplifiers used for talking picture apparatus where the sound record is a photographic one and the reproduction includes the use of a supersensitive high impedance photo-electric cell circuit.

Many and various kinds and types of rectifiers for alternating current have been devised and used for rectifying alternating current, thus permitting the use of alternating current amplifiers and eliminating the use of batteries. Such rectifiers, however, even in their present state of perfection fail to entirely do away with the alternating current hum especially in such sensitive circuits as photo-electric cell circuits.

The primary object of my invention is to provide a means and method in connection with the photo-electric cell current which eliminates the alternating current hum and permits the use of an amplifier completely powerized from an alternating current source.

Other objects and advantages will be apparent as the description proceeds, reference being had to the figure of the accompanying drawing forming a part of this application and wherein like reference numbers indicate like parts.

In the drawing:

The single figure is a diagrammatic illustration of my invention showing one application thereof. It will be understood, of course, that there are many circuits with which my invention may be employed and the one herein shown and described is intended as illustrative only.

My invention has been illustrated in connection with the translation and audible reproduction of photographic sound records embodying the use of a photo-electric cell.

The reference character 1 refers to an exciting lamp of any suitable construction and 2 indicates generally an optical slit unit by means of which a very narrow beam of light from the lamp 1 is sharply focused as a slit image upon a sound record carried by the photographic film 3 suitably moved past the point of translation 4 and in alignment with the photo-electric cell 5 adapted to receive the modulated light rays passing therethrough. The details of this translating apparatus form no part of this invention and require no further description.

A source of alternating current on the order of approximately 110 volts is indicated diagrammatically at 6, a switch 7 being provided in the line between the source and a rectifier unit outlined by the dotted line 8. This rectifier unit may be of any desired or known practical type and may include a transformer 9, the current from the secondary of which is rectified by the tube 10 and the direct current output of which is suitably controlled as at 11.

In the illustration shown, an 8 volt rectified current is taken from the rectifier 8 by means of the wires 12 to supply the current for the exciter lamp 1. This same 8 volt rectified current outlet from the rectifier 8 is also used through the wires 13 for the field current of the horn or loud speaker 14.

The photo-electric cell amplifier is outlined by the dotted line 15. This amplifier may be of any desired construction and circuit arrangement and of any desired number of stages. In the form shown it is a one stage amplifier consisting essentially of the tube 16, the output of which passes through the transformer 17 and through a volume and tone control outlined by the dotted line 18, to the main amplifier, the circuit of which is outlined by the dotted line 19. The volume and tone control for the output of the photo-electric cell amplifier may be of any desired construction and in the form shown is merely a potentiometer control for the volume and filter for the frequency of the signals from the photo-electric cell amplifier.

The current for the filament of the tube 16 in the photo-electric cell amplifier is supplied from the 8 volt rectified current line from the rectifier through the wires 12 by means of the wires 20. Any suitable current control such as the rheostat 21 may be provided in this filament circuit.

Referring now to the main amplifier 19 the same is supplied with current from the 110 volt alternating current source which may be the same source as indicated at 6 and in the line of which is provided a switch 22. The current enters the main amplifier through a transformer 23, one secondary 23a of which supplies current which is rectified by a suitable rectifier indicated generally by the tubes 24, the rectified current output of which is filtered in the conventional manner and then divided by any suitable voltage divider circuit to provide outlets of rectified alternating current of different voltages, as is indicated generally at 25.

A current of 100 volts is taken from this voltage divider through the wire 26 and led to the photo-electric cell amplifier and impressed upon the anode 27 of the photo-electric cell through the wire 28 and resistance 28a, and upon the primary of the transformer 17 through the wire 29 to supply a space current to tube 16. There is provided in the circuit of this 100 volt current between its source and the photo-electric cell and the transformer, an inductive reactance (choke coil) 30 many times the order of magnitude of usual filter coils, and preferably of the order of 200 to 300 henrys. This coil is preferably separate from the regular filter circuit of rectifier 24, and is preferably located immediately adjacent the photo-electric cell and photo-electric cell amplifier, as shown, to prevent pick-up on the conductors beyond the choke 30. It may be and preferably is located inside of the shield or metallic container 15 of the photo-electric cell amplifier, as is clearly evident from the drawing. It is this choke coil 30 which results in the elimination of hum in the amplifying and photo-electric cell circuit. It should be stated here that the interposition of the choke 30 in this line, reduces the voltage from 100 volts to approximately 90, due to resistance of windings of same, the correct voltage for the photo-electric cell and space current of tube 16.

In a circuit such as just described, and as defined in the first paragraph of this description, there exists in the circuit connected by wire 26 which supplies polarizing voltage to the photo-electric circuit anode 27 and space current to thermionic tube 16, in addition to the familiar direct current of the order of 90 to 100 volts, an alternating component composed of the fundamental 60 cycle power wave and its respective harmonic waves. Choke 30 offers no more impedance to the flow of direct current than the resistance of its windings, but the flow of an alternating current of any kind is greatly retarded due to the high inductive reactance of this choke.

The main amplifier 19 may be of any desired number of stages of amplification and of any desired circuit arrangement, the one illustrated comprising the two stages indicated by the tubes 31, impedance coupled, and the tubes 32 of a push-pull arrangement, the output of which is through a transformer 33, the secondary of which may be tapped and connected by the wires 34 to the loud speaker.

Current is supplied to the filaments of the amplifier tubes 31 from the filament secondary 23b of the transformer 23, through the wires 35 and 36. Current is supplied to the filaments of the rectifier tubes 24 through the secondary 23a. Current for the filaments of the push-pull tubes 32 is supplied from the filament of secondary 23c of the power transformer 23, through the wires 37. The plate current for the plate of the first tube 31 is supplied through the wire 38 from a 90 volt tap on the voltage divider 25. Current for the plate of the second tube 31 is supplied through the wire 39 from the 135 volt tap of the voltage divider 25. Plate current for push-pull tubes is supplied through wire 40 from an intermediate point on the filter circuit.

By the foregoing method and construction I have found that the alternating current hum which is apparent in amplifiers of this character in spite of the known means of alternating current rectification and filtration, can be eliminated by the relatively simple, economical and expedient use of a choke in the photo-electric cell circuit, provided said choke is of the large magnitude specified, and provided it is localized at the photo-electric cell and photo-electric cell amplifier.

Of course, changes made be made in details of arrangement without departing from the spirit and scope of my invention. I do not limit myself, therefore, to the exact form herein shown and described other than by the appended claims.

I claim:

1. Sound reproducing equipment comprising a photo-electric cell, a source of alternating current, a rectifier and filter circuit of conventional type operating from said source of alternating current to supply a polarizing potential to said cell, and an additional choke separate from the aforesaid filter and connected in the supply lead for the polarizing potential at a point preceding but immediately adjacent the photo-electric cell.

2. Sound reproducing equipment comprising a photo-electric cell, a source of alternating current, a rectifier and filter circuit of conventional type operating from said source of alternating current to supply a polarizing potential to said cell, and an additional large choke separate from the aforesaid filter and having a magnitude many times that of a conventional filter choke, said choke being connected in the supply lead for the polarizing potential at a point preceding but immediately adjacent the photo-electric cell.

3. Sound reproducing equipment comprising a photo-electric cell, a source of alternating current, a rectifier and filter circuit of conventional type operating from said source of alternating current to supply a polarizing potential to said cell, and an additional choke separate from the aforesaid filter and having a magnitude of from 200 to 300 henrys connected in the supply lead for the polarizing potential at a point preceding but immediately adjacent the photo-electric cell.

4. Sound reproducing equipment comprising a source of illumination, a photo-electric cell and localized photo-electric amplifier, a phonographic record of sound, means to cause said record to travel between said source and said cell, a source of alternating current, conventional rectifier and filter means connected to said source for providing anode current for the cell and cell amplifier, and a large choke separate from the aforesaid filter and connected directly in series with the anode supply lead and localized at a point preceding but closely adjacent the photo-electric cell and amplifier.

5. Sound reproducing equipment comprising a source of illumination, a photo-electric cell and localized photo-electric amplifier, a phonographic record of sound, means to cause said record to travel between said source and said cell, a source of alternating current, conventional rectifier and filter means connected to said source for providing anode current for the cell and cell amplifier, and a choke having an inductance of the order of 200 to 300 henrys connected directly in series with the anode supply at a point preceding but closely adjacent the photo-electric cell and amplifier.

FREEMAN H. OWENS.